United States Patent
Nagata

(10) Patent No.: US 11,519,933 B2
(45) Date of Patent: Dec. 6, 2022

(54) PHYSICAL QUANTITY SENSOR, ELECTRONIC APPARATUS, AND VEHICLE

(71) Applicant: SEIKO EPSON CORPORATION, Tokyo (JP)

(72) Inventor: Kazuyuki Nagata, Minowa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 589 days.

(21) Appl. No.: 16/521,927

(22) Filed: Jul. 25, 2019

(65) Prior Publication Data
US 2020/0033378 A1  Jan. 30, 2020

(30) Foreign Application Priority Data
Jul. 26, 2018  (JP) .............................. JP2018-140030

(51) Int. Cl.
*G01P 15/125* (2006.01)
*B60R 16/023* (2006.01)

(52) U.S. Cl.
CPC ........ *G01P 15/125* (2013.01); *B60R 16/0231* (2013.01)

(58) Field of Classification Search
CPC .................................................... G01P 15/125
USPC ..................................................... 73/514.32
See application file for complete search history.

(56) References Cited

U.S. PATENT DOCUMENTS

| | | | |
|---|---|---|---|
| 5,983,721 A * | 11/1999 | Sulzberger | ............ B81B 3/0072 361/280 |
| 6,065,341 A | 5/2000 | Ishio et al. | |
| 8,393,215 B2 | 3/2013 | Stahl et al. | |
| 9,815,687 B2 | 11/2017 | Merassi | |
| 2015/0085901 A1 | 3/2015 | Chomal et al. | |
| 2018/0156839 A1* | 6/2018 | Tanaka | .................. G01P 15/125 |

FOREIGN PATENT DOCUMENTS

JP    H11-230985 A    8/1999

* cited by examiner

*Primary Examiner* — Walter L Lindsay, Jr.
*Assistant Examiner* — PhilipMarcus T Fadul
(74) *Attorney, Agent, or Firm* — Rankin, Hill & Clark LLP

(57) ABSTRACT

An acceleration sensor as a physical quantity sensor includes: a substrate; a correction electrode fixed to the substrate; a detection electrode fixed to the substrate; and a moving member fixed to the substrate. The moving member has: a base part; a first anchor part fixed to the substrate; a first finger electrode extending from the base part and facing the correction electrode; a mass part provided in such a way as to be displaceable in a direction of detection of a physical quantity in relation to the substrate; and a second finger electrode extending from the mass part and facing the detection electrode. A distance between a second anchor part where the detection electrode and the substrate are fixed, and the base part, is shorter than a distance between the second anchor part and the mass part.

13 Claims, 9 Drawing Sheets

PHYSICAL QUANTITY SENSOR, ELECTRONIC APPARATUS, AND VEHICLE

The present application is based on, and claims priority from JP Application Serial Number 2018-140030, filed Jul. 26, 2018, the disclosure of which is hereby incorporated by reference herein in its entirety.

BACKGROUND

1. Technical Field

The present disclosure relates to a physical quantity sensor, an electronic apparatus, and a vehicle.

2. Related Art

Recently, a physical quantity sensor manufactured using the MEMS (micro-electromechanical systems) technology has been developed. As such a physical quantity sensor, for example, US2015/085901A1 discloses an electrostatic capacitance-type acceleration sensor which has a functional element having a moving electrode (finger electrode) and a fixed electrode (detection electrode) arranged facing each other in a comb-like form, in which the space between the moving electrode and the fixed electrode changes when an acceleration (physical quantity) is applied to the moving electrode, and which detects the acceleration based on the electrostatic capacitance between these two electrodes. In this acceleration sensor, in order to eliminate the influence of a stress caused by warping or the like due to temperature change of a substrate to which the functional element is fixed, a part of the fixed electrode is formed as a correction electrode and a stress applied to the substrate is detected as a change in the electrostatic capacitance between the moving electrode and the correction electrode. Thus, the influence of the stress applied to the substrate is corrected and detection accuracy is increased.

However, in the physical quantity sensor disclosed in US2015/085901A1, the position of a anchor part where the moving electrode is fixed to the substrate and the position of a anchor part where the fixed electrode (detection electrode and correction electrode) is fixed to the substrate are spaced apart from each other. This results in a large amount of displacement in the warping of the substrate due to temperature change. Therefore, a large correction error occurs in correcting the influence of the warping of the substrate, posing the problem of reduced detection accuracy for the physical quantity applied to the physical quantity sensor.

SUMMARY

A physical quantity sensor according to an aspect of the disclosure includes: a substrate; a correction electrode fixed to the substrate; a detection electrode fixed to the substrate; and a moving member fixed to the substrate. The moving member has: a base part; a first anchor part fixed to the substrate; a first finger electrode extending from the base part and facing the correction electrode; a mass part coupled to the base part via an elastic part, arranged at an opposite side of the correction electrode from the base part, and provided in such a way as to be displaceable in a direction of detection of a physical quantity in relation to the substrate; and a second finger electrode extending from the mass part and facing the detection electrode. A distance between a second anchor part where the detection electrode and the substrate are fixed, and the base part, is shorter than a distance between the second anchor part and the mass part.

In the physical quantity sensor, a distance between a third anchor part where the correction electrode and the substrate are fixed, and the base part, may be shorter than a distance between the third anchor part and the mass part.

In the physical quantity sensor, a distance between a third anchor part where the correction electrode and the substrate are fixed, and the base part, may be longer than a distance between the third anchor part and the mass part.

In the physical quantity sensor, the mass part may be spaced apart from the substrate.

In the physical quantity sensor, the correction electrode and the detection electrode may respectively have a rectangular shape.

In the physical quantity sensor, the correction electrode may have a protrusion protruding to a side opposite to a side facing the first finger electrode. The detection electrode may have a protrusion protruding to a side opposite to a side facing the second finger electrode.

In the physical quantity sensor, the correction electrode may have a first correction electrode and a second correction electrode. The detection electrode may have a first detection electrode and a second detection electrode. The first correction electrode and the second detection electrode may be arranged in line symmetry about an axis in the direction of detection.

In the physical quantity sensor, the first correction electrode and the second correction electrode may be arranged in point symmetry about a center of gravity of the moving member.

An electronic apparatus according to another aspect of the disclosure includes: the foregoing physical quantity sensor; and a control unit performing control based on a detection signal outputted from the physical quantity sensor.

A vehicle according to still another aspect of the disclosure includes: the foregoing physical quantity sensor; and a control unit performing control based on a detection signal outputted from the physical quantity sensor.

DESCRIPTION OF EXEMPLARY EMBODIMENTS

The physical quantity sensor, the electronic apparatus, and the vehicle according to the disclosure will now be described in detail, based on embodiments shown in the accompanying drawings. The embodiments described below should not unduly limit the content of the disclosure described in the appended claims. Not all the configurations described in the embodiments are essential elements of the disclosure.

Physical Quantity Sensor

First Embodiment

Figure 1:
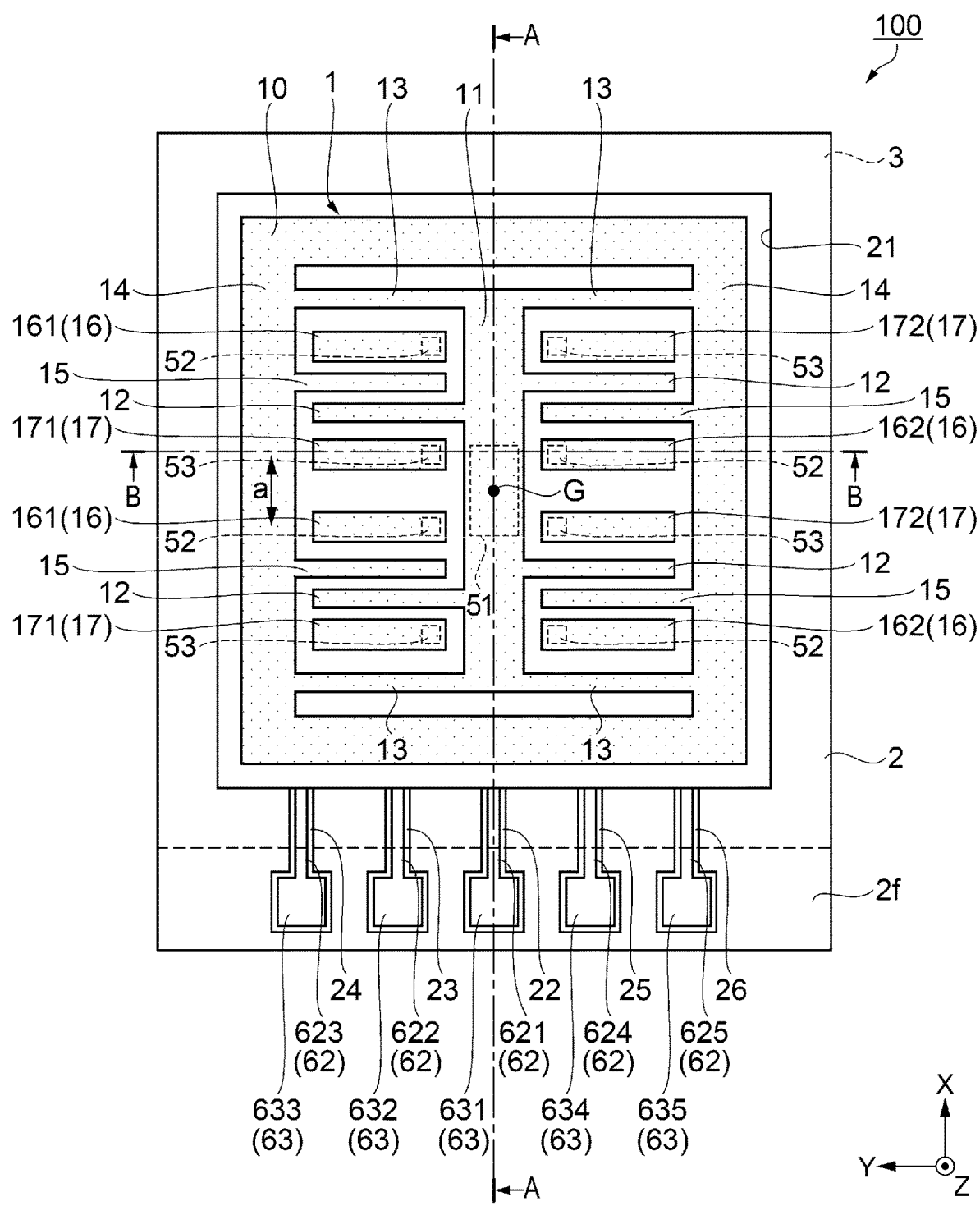
FIG. 1 is a plan view showing a schematic structure of a physical quantity sensor according to a first embodiment of the disclosure.
Figure 2:
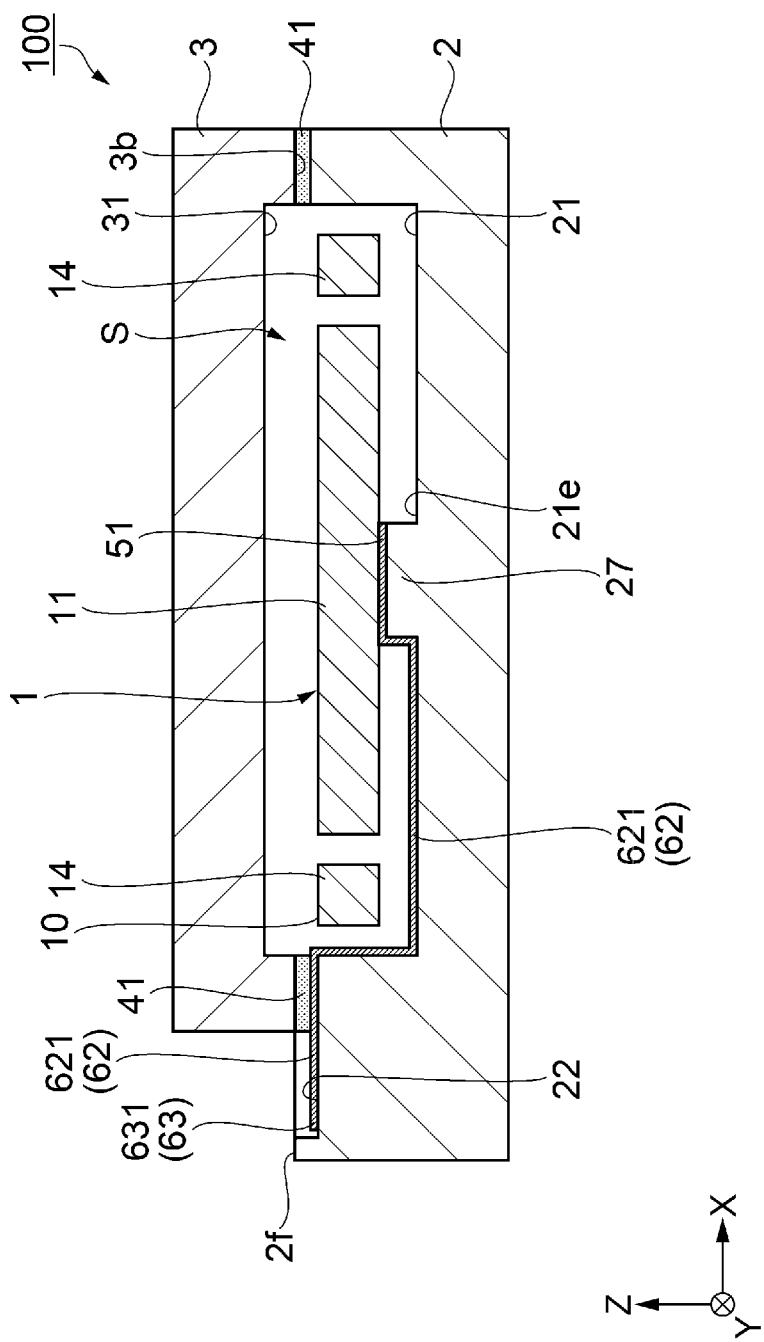
FIG. 2 is a cross-sectional view taken along A-A in FIG. 1.
Figure 3:
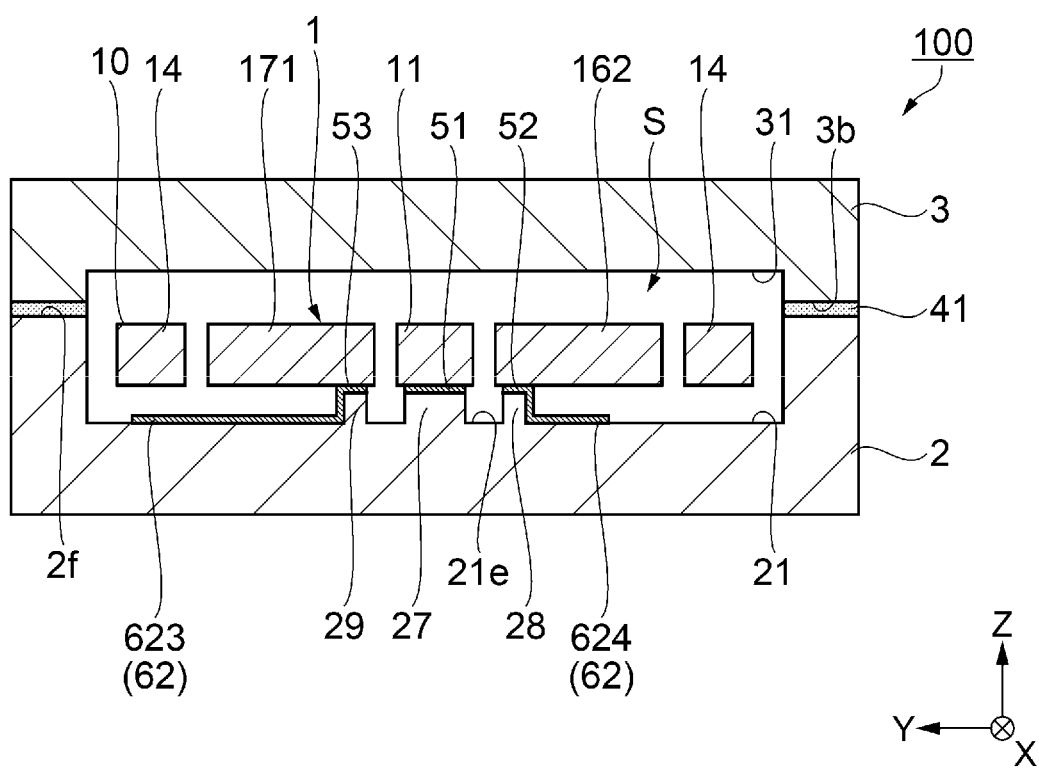
FIG. 3 is a cross-sectional view taken along B-B in FIG. 1.

First, a physical quantity sensor according to a first embodiment of the disclosure is described, using an acceleration sensor 100 measuring an acceleration as a physical quantity in an in-plane direction (direction along an X-axis) of a functional element 1, as an example, and referring to FIGS. 1, 2, and 3.

FIG. 1 is a plan view showing a schematic structure of the physical quantity sensor according to the first embodiment of the disclosure. FIG. 2 is a cross-sectional view taken along A-A in FIG. 1. FIG. 3 is a cross-sectional view taken along B-B in FIG. 1. FIG. 1 shows the state where a lid 3 is removed, for the sake of convenience in describing the internal configuration of the acceleration sensor 100. Also, in FIG. 1, the illustration of a wiring 62 in a recess 21 of a substrate 2 is omitted.

For the sake of convenience of the description, an X-axis, a Y-axis, and a Z-axis are illustrated in the drawings, as three axes orthogonal to each other. An axis parallel to the X-axis is referred to as a "direction along the X-axis". An axis parallel to the Y-axis is referred to as a "direction along the Y-axis". An axis parallel to the Z-axis is referred to as a "direction along the Z-axis". The direction along the Z-axis is along a vertical direction. An XY plane is along a horizontal plane. The side of the distal end of the arrow along each axis is referred to as a "positive (+) side". The side of the proximal end is referred to as "negative (−) side". The positive side on the Z-axis is referred to as "up". The negative side on the Z-axis is referred to as "down".

The acceleration sensor 100 shown in FIGS. 1, 2, and 3 can measure an acceleration as a physical quantity on an in-plane direction (direction along the X-axis) of the functional element 1. The acceleration sensor 100 has the substrate 2, a wiring pattern (wiring 62, terminal 63) provided at the substrate 2, the lid 3, and the functional element 1 accommodated in an internal space S formed by the substrate 2 and the lid 3. These components will now be described in order.

Substrate

The recess 21 opening to the side of an upper surface 2f is formed at the substrate 2. The recess 21 functions as an escape to prevent contact between the functional element 1 and the substrate 2. Also, five grooves 22, 23, 24, 25, 26 opening to the side of the upper surface 2f and coupled to the recess 21 are formed at the substrate 2. The wiring 62 and the terminal 63 are arranged in the grooves 22, 23, 24, 25, 26. Such a substrate 2 is made up of, for example, a glass substrate and has its outer shape formed by etching or the like. However, the substrate 2 is not limited to the glass substrate and may be, for example, a silicon substrate or the like.

Wiring Pattern

The wiring 62 has a first wiring 621 arranged in the groove 22 and electrically coupled to a moving member 10 of the functional element 1 at a first anchor part 51, a second wiring 622 arranged in the groove 23 and electrically coupled to a first detection electrode 161 at a second anchor part 52, a third wiring 623 arranged in the groove 24 and electrically coupled to a first correction electrode 171 at a third anchor part 53, a fourth wiring 624 arranged in the groove 25 and electrically coupled to a second detection electrode 162 at a second anchor part 52, and a fifth wiring 625 arranged in the groove 26 and electrically coupled to a second correction electrode 172 at a third anchor part 53.

The terminal 63 has a first terminal 631 arranged at a proximal end of the groove 22 and electrically coupled to the first wiring 621, a second terminal 632 arranged at a proximal end of the groove 23 and electrically coupled to the second wiring 622, a third terminal 633 arranged at a proximal end of the groove 24 and electrically coupled to the third wiring 623, a fourth terminal 634 arranged at a proximal end of the groove 25 and electrically coupled to the fourth wiring 624, and a fifth terminal 635 arranged at a proximal end of the groove 26 and electrically coupled to the fifth wiring 625. The first terminal 631, the second terminal 632, the third terminal 633, the fourth terminal 634, and the fifth terminal 635 are exposed outside the lid 3 and configured to be electrically coupled to an external device.

In this embodiment, the wiring 62 and the terminal 63 are made of Pt (platinum). This can reduce the electrical resistivity of the wiring 62 and the terminal 63 and can achieve noise reduction and improvement in response. Also, the wiring 62 and the terminal 63 have a high temperature characteristic (high reliability against temperature). To improve contactability between the wiring 62 and the terminal 63, and the substrate 2, an underlying layer (for example, a Ti layer) may be arranged between these, according to need.

The material forming the wiring 62 and the terminal is not limited to Pt, provided that the material is electrically conductive. For example, a metal material (including an alloy) other than Pt, such as Au, Ag, Cu, or Al, or an oxide-based conductive material such as ITO (indium tin oxide), IZO (indium zinc oxide), $In_3O_3$, $SnO_2$, $SnO_2$ containing Sb, or ZnO containing Al may be employed. Of these materials, one or a combination of two or more can be used. Also, the wiring 62 and the terminal 63 may be made of different materials from each other.

Functional Element

The functional element 1 is fixed to anchors 27, 28, 29 provided in the recess 21 of the substrate 2. The functional element 1 has: a moving member 10 including a base part 11, an elastic part 13, and a mass part 14; a plurality of detection electrodes 16; and a plurality of correction electrodes 17. The base part 11 has a plurality of first finger electrodes 12 extending to both sides along the Y-axis. The mass part 14 has a plurality of second finger electrodes 15 extending toward the base part 11. Such a functional element 1 is formed, for example, of a silicon substrate doped with an impurity such as phosphorus or boron.

The moving member 10 is fixed to the substrate 2 at the first anchor part 51 including a center of gravity G of the moving member 10. More specifically, the moving member 10 is fixed to an upper surface of the anchor 27 protruding toward the upper surface 2f from an inner bottom surface 21e of the recess 21 of the substrate 2. The moving member 10 is electrically coupled to the first wiring 621 by anodic bonding or bump bonding using an electrically conductive bump, or the like, at the first anchor part 51 where the base part 11 and the substrate 2 are fixed. The plurality of first finger electrodes 12 protruding to both sides along the Y-axis are formed at the base part 11. When an acceleration in a direction along the X-axis is applied, the first finger electrode 12 provided at the base part 11 is not displaced in the direction along the X-axis because the base part 11 is fixed to the substrate 2. Therefore, even when an acceleration is applied, the electrostatic capacitance between the first finger electrode 12 and the correction electrode 17 does not change. Also, the elastic part 13 displaceable in a direction along the X-axis, which is a direction of detection of the acceleration, is provided at both ends along the X-axis of the base part 11. The base part 11 is thus coupled to the mass part 14 via the elastic part 13. That is, the base part 11 and the mass part 14 are coupled and integrated together via the elastic part 13.

The mass part 14 is arranged in the recess 21 of the substrate 2, spaced apart from the substrate 2, coupled to the base part 11 via the elastic part 13, and arranged on the opposite side of the correction electrode 17 from the base part 11. The mass part 14 also has the plurality of second finger electrodes 15 extending from the mass part 14 toward the base part 11. The second finger electrode 15 extending to the negative side on the Y-axis from the mass part 14 is arranged on the positive side on the X-axis of each first finger electrode 12 and is arrayed spaced apart from and interdigitally with the first finger electrode 12 facing this second finger electrode 15. The second finger electrode 15 extending to the positive side on the Y-axis from the mass part 14 is arranged on the negative side on the X-axis of each first finger electrode 12 and is arrayed spaced apart from and interdigitally with the first finger electrode 12 facing this second finger electrode 15. The mass part 14 is coupled to the base part 11 via the elastic part 13. Therefore, the mass part 14 can be displaced in a direction along the X-axis, which is a direction of detection of an acceleration, as indicated by an arrow a in relation to the substrate 2, while elastically deforming the elastic part 13. Thus, when an acceleration is applied in a direction along the X-axis, the second finger electrode 15 is displaced in the direction along the X-axis together with the mass part 14. Consequently, the electrostatic capacitance between the second finger electrode and the detection electrode 16 changes. Thus, the acceleration can be detected.

The detection electrode 16 is fixed to the substrate at the second anchor part 52. More specifically, the detection electrode 16 is fixed to an upper surface of the anchor 28 protruding toward the upper surface 2f from the inner bottom surface 21e of the recess 21 of the substrate 2. The detection electrode 16 is electrically coupled to the second wiring 622 and the fourth wiring 624 by anodic bonding or bump bonding using an electrically conductive bump, or the like, at the second anchor part 52 where the detection electrode 16 and the substrate 2 are fixed. The detection electrode 16 is rectangular, having its longitudinal direction along the Y-axis. The distance between the second anchor part 52, where the detection electrode 16 and the substrate 2 are fixed, and the base part 11, is shorter than the distance between the second anchor part 52 and the mass part 14. That is, the second anchor part 52 is located at an end on the side of the base part 11 of the detection electrode 16. The detection electrode 16 also has the first detection electrode 161 arranged on the positive side on the X-axis of the second finger electrode 15 and facing the second finger electrode 15, and the second detection electrode 162 arranged on the negative side on the X-axis of the second finger electrode 15 and facing the second finger electrode 15. The distance between the second anchor part 52 and the base part 11 refers to the shortest distance between the second anchor part 52 and the base part 11 along the Y-axis. The distance between the second anchor part 52 and the mass part 14 refers to the shortest distance between the second anchor part 52 and the mass part 14 along the Y-axis.

The correction electrode 17 is fixed to the substrate at the third anchor part 53. More specifically, the correction electrode 17 is fixed to an upper surface of the anchor 29 protruding toward the upper surface 2f from the inner bottom surface 21e of the recess 21 of the substrate 2. The correction electrode 17 is electrically coupled to the third wiring 623 and the fifth wiring 625 by anodic bonding or bump bonding using an electrically conductive bump, or the like, at the third anchor part 53 where the correction electrode 17 and the substrate 2 are fixed. The correction electrode 17 is rectangular, having its longitudinal direction along the Y-axis. The distance between the third anchor part 53, where the correction electrode 17 and the substrate 2 are fixed, and the base part 11, is shorter than the distance between the third anchor part 53 and the mass part 14. That is, the third anchor part 53 is located at an end on the side of the base part 11 of the correction electrode 17. The correction electrode 17 also has the first correction electrode 171 arranged on the negative side on the X-axis of the first finger electrode 12 and facing the first finger electrode 12, and the second correction electrode 172 arranged on the positive side on the X-axis of the first finger electrode 12 and facing the first finger electrode 12. The distance between the third anchor part 53 and the base part 11 refers to the shortest distance between the third anchor part 53 and the base part 11 along the Y-axis. The distance between the third anchor part 53 and the mass part 14 refers to the shortest distance between the third anchor part 53 and the mass part 14 along the Y-axis. Hereinafter, the distance between a predetermined object and a different object from the predetermined object is similarly defined as the shortest distance between the predetermined object and the different object from the predetermined object along the Y-axis.

The first correction electrode 171 and the second detection electrode 162 are arranged in line symmetry about the X-axis, which is the axis in the direction of detection of an acceleration. The second correction electrode 172 and the first detection electrode 161 are arranged in line symmetry about the X-axis, which is the axis in the direction of detection of an acceleration. Therefore, the distance between the second anchor part 52 of the detection electrode 16 and the third anchor part 53 of the correction electrode 17, and the first anchor part 51, can be equalized and therefore a stress due to warping of the substrate 2 is equally applied to the detection electrode 16 and the correction electrode 17. Since the stress applied to the detection electrode 16 and the stress applied to the correction electrode 17 are equalized, the influence of the stress applied to the detection electrode 16 can be corrected. The distance between the second anchor part 52 and the third anchor part 53, and the first anchor part 51, refers to the shortest distance between the second anchor part 52 and the third anchor part 53, and the first anchor part 51.

The first correction electrode 171 and the second correction electrode 172 are arranged in point symmetry about the center of gravity G of the moving member 10. The first detection electrode 161 and the second detection electrode 162 are arranged in point symmetry about the center of gravity G of the moving member 10. Therefore, the distance between the third anchor part 53 of the first correction electrode 171 and the first anchor part 51 and the distance between the second anchor part 52 of the first detection electrode 161 and the first anchor part 51 can be equalized. Also, the distance between the third anchor part 53 of the second correction electrode 172 and the first anchor part 51 and the distance between the second anchor part 52 of the second detection electrode 162 and the first anchor part 51 can be equalized. Therefore, the distance between the third anchor part 53 of the correction electrode 17 and the second anchor part 52 of the detection electrode 16, and the first anchor part 51, can be equalized, and the stress applied to the correction electrode 17 and the stress applied to the detection electrode 16 are equalized. Therefore, the influence of the stress applied to the detection electrode 16 can be corrected. The distance between the third anchor part 53 and the first anchor part 51 refers to the shortest distance between the third anchor part 53 and the first anchor part 51. The distance between the second anchor part 52 and the first anchor part 51 refers to the shortest distance between the second anchor part 52 and the first anchor part 51.

As a material forming such a functional element 1, silicon, glass or the like is used. This enables high-precision processing by etching and therefore provides the functional element 1 with an excellent outer shape. When silicon is used, the functional element 1 can be bonded to the substrate 2 by anodic bonding. This provides the acceleration sensor 100 with high mechanical strength.

Lid

The lid 3 has a recess 31 opening toward a lower surface 3b and is bonded to the substrate 2 via a bonding member 41 such as low-melting glass in such a way that the recess 31 and the recess 21 provided at the substrate 2 form the internal space S. Such a lid 3 is formed of a glass substrate. When the lid 3 is formed of silicon, the lid 3 and the substrate 2 can be bonded together by anodic bonding.

Since the inside and outside of the internal space S communicate with each other via the grooves 22, 23, 24, 25, 26, the bonding member 41 closes the grooves 22, 23, 24, 25, 26 and thus forms the internal space S. This can turn the internal space S into a desired environment such as vacuum or nitrogen atmosphere. When the lid 3 and the substrate 2 are bonded together by anodic bonding, the grooves 22, 23, 24, 25, 26 can be closed using a filling member or the like. As the filling member, an insulating film such as an $SiO_2$ (silicon oxide) film (more specifically, TEOS (tetraethyl orthosilicate) film) or SiN (silicon nitride) film is used. The film is deposited by CVD or the like.

Such an acceleration sensor 100 detects an acceleration in the following manner. That is, when an acceleration in a direction along the X-axis is applied to the acceleration sensor 100, the mass part 14 of the moving member 10 is displaced in the direction along the X-axis, based on the magnitude of the acceleration. With such a displacement, the gap between the second finger electrode 15 and the detection electrode 16 changes and the electrostatic capacitance between the second finger electrode 15 and the detection electrode 16 changes. Therefore, the magnitude of the acceleration can be detected, based on the difference in the electrostatic capacitance. Meanwhile, the correction via the correction electrode 17 of a stress applied to the substrate 2 is carried out in the following manner. The first finger electrode 12 facing the correction electrode 17 is coupled to the base part 11 fixed to the substrate 2 and therefore is not displaced even when an acceleration is applied. Therefore, the gap between the first finger electrode 12 and the correction electrode 17 does not change and the electrostatic capacitance between the first finger electrode 12 and the correction electrode 17 does not change, either. However, a stress caused by warping or the like of the substrate 2 due to temperature change occurs between the first anchor part 51 and the second anchor part 52 and between the first anchor part 51 and the third anchor part 53. Since the distance between the first anchor part 51 and the second anchor part 52 and the distance between the first anchor part 51 and the third anchor part 53 are equal, the electrostatic capacitance between the second finger electrode and the detection electrode 16 and the electrostatic capacitance between the first finger electrode 12 and the correction electrode 17 change equally. Thus, subtracting the electrostatic capacitance between the first finger electrode 12 and the correction electrode 17 changed only by the stress, from the electrostatic capacitance between the second finger electrode 15 and the detection electrode 16 changed by the acceleration and the stress, enables detection of the magnitude of the acceleration with the influence of the stress corrected.

In the acceleration sensor 100, the distance between the second anchor part 52, where the detection electrode 16 and the substrate 2 are fixed, and the base part 11, is shorter than the distance between the second anchor part 52 and the mass part 14. This can reduce the distance between the second anchor part 52 and the first anchor part 51, where the moving member 10 is fixed to the substrate 2. Therefore, even when the substrate 2 warps, for example, due to temperature change, the amount of displacement of the warping of the substrate 2 is smaller than when the distance between the second anchor part 52 and the first anchor part 51 is longer. This can reduce the influence on the detection electrode 16 of the stress applied to the substrate 2 and therefore can reduce the correction error and improve the detection accuracy for an acceleration applied to the acceleration sensor 100.

Also, the distance between the third anchor part 53, where the correction electrode 17 and the substrate 2 are fixed, and the base part 11, is shorter than the distance between the third anchor part 53 and the mass part 14. Therefore, the stress applied between the third anchor part 53 of the correction electrode 17 and the first anchor part 51 of the moving member 10 due to the warping of the substrate 2 can be reduced. This can reduce the influence on the correction electrode 17 of the stress applied to the substrate 2, further reduce the correction error, and therefore improve the detection accuracy for an acceleration applied to the acceleration sensor 100.

Since the mass part 14 is spaced apart from the substrate 2, the mass part 14 can easily move due to an acceleration applied to the acceleration sensor 100. Therefore, an acceleration applied to the acceleration sensor 100 can be easily detected.

Since the correction electrode 17 and the detection electrode 16 are respectively rectangular, a large facing area with the first finger electrode 12 and the second finger electrode 15 can be secured, and a large electrostatic capacitance value between the correction electrode 17 and the first finger electrode 12 and a large electrostatic capacitance value between the detection electrode 16 and the second finger electrode 15 can be secured. This can further improve the detection accuracy for an acceleration applied to the acceleration sensor 100.

Since the first correction electrode 171 and the second detection electrode 162 are arranged in line symmetry about the axis in the direction of detection, the distance between the third anchor part 53 of the first correction electrode 171 and the second anchor part 52 of the second detection electrode 162, and the first anchor part 51, can be equalized and the stress due to the warping of the substrate 2 can be equalized between these. Thus, the distance between the third anchor part 53 of the correction electrode 17 and the second anchor part 52 of the detection electrode 16, and the first anchor part 51, is equalized, and the stress applied to the correction electrode 17 and the stress applied to the detection electrode 16 are equalized. Therefore, the influence of the stress applied to the detection electrode 16 can be corrected.

Since the first correction electrode 171 and the second correction electrode 172 are arranged in point symmetry about the center of gravity G of the moving member 10, the distance between the third anchor part 53 of the first correction electrode 171 and the first anchor part 51 and the distance between the second anchor part 52 of the first detection electrode 161 and the first anchor part 51 can be equalized. Also, the distance between the third anchor part 53 of the second correction electrode 172 and the first anchor part 51 and the distance between the second anchor part 52 of the second detection electrode 162 and the first anchor part 51 can be equalized. Thus, the distance between the third anchor part 53 of the correction electrode 17 and the second anchor part 52 of the detection electrode 16, and the first anchor part 51, is equalized, and the stress applied to the correction electrode 17 and the stress applied to the detection electrode 16 are equalized. Therefore, the influence of the stress applied to the detection electrode 16 can be corrected.

Second Embodiment

Next, a physical quantity sensor according to a second embodiment of the disclosure will be described, using an acceleration sensor 100a as an example and referring to FIGS. 4 and 5.

Figure 4:
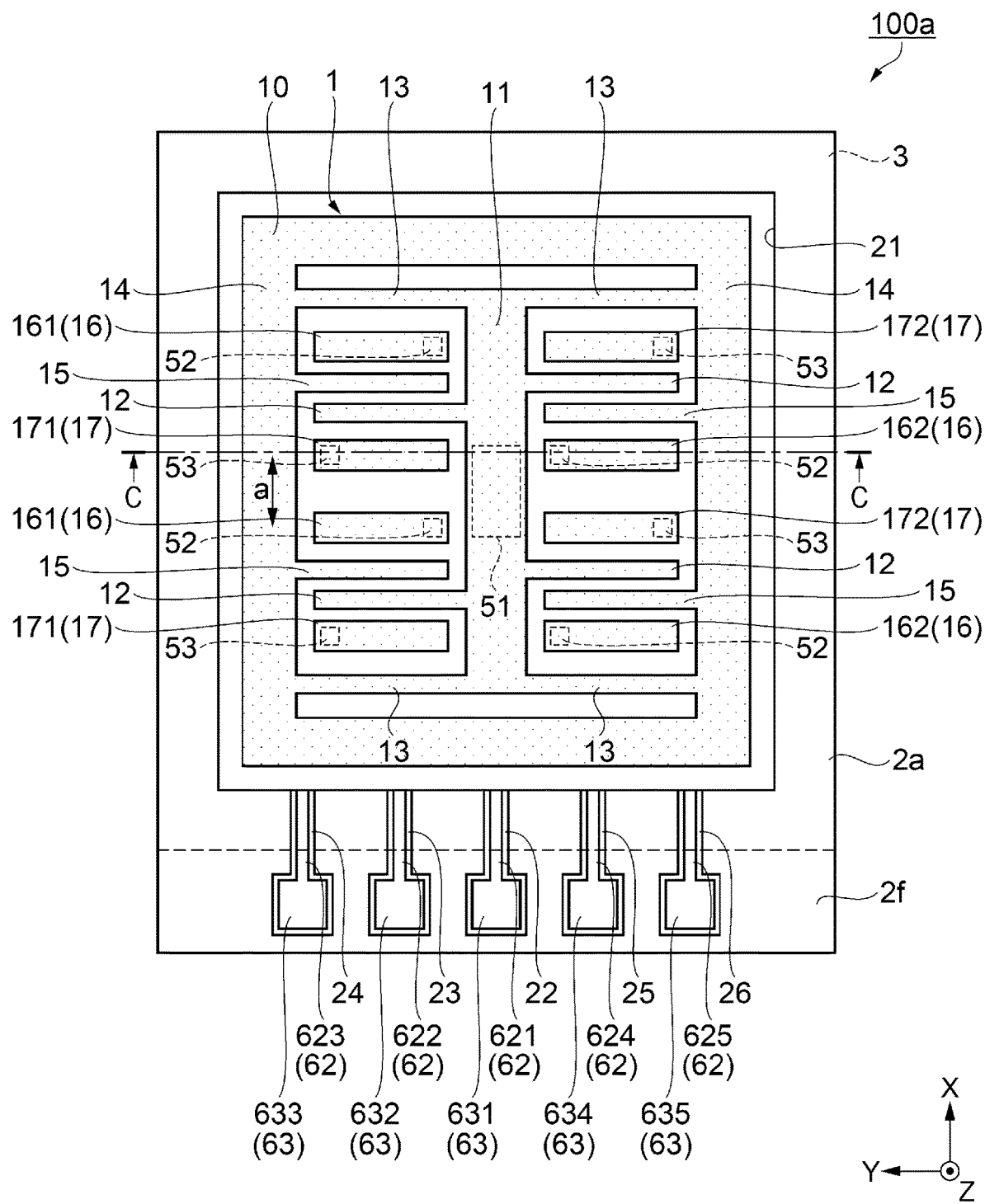
FIG. 4 is a plan view showing a schematic structure of a physical quantity sensor according to a second embodiment of the disclosure.

FIG. 4 is a plan view showing a schematic structure of the physical quantity sensor according to the second embodiment of the disclosure. FIG. 5 is a cross-sectional view taken along C-C in FIG. 4. FIG. 4 shows the state where the lid 3 is removed for the sake of convenience in describing the internal configuration of the acceleration sensor 100a. In FIG. 4, the wiring 62 in the recess 21 of a substrate 2a is omitted.

The acceleration sensor 100a according to this embodiment is similar to the acceleration sensor 100 according to the first embodiment except that mainly the position of the third anchor part 53 of the correction electrode 17 and the configuration of the wiring 62 are different.

In the description below, the acceleration sensor 100a according to the second embodiment is described mainly in terms of the difference from the foregoing embodiment and the description of similar matters is omitted. In FIGS. 4 and 5, components similar to those in the foregoing embodiment are denoted by the same reference signs.

Figure 5:
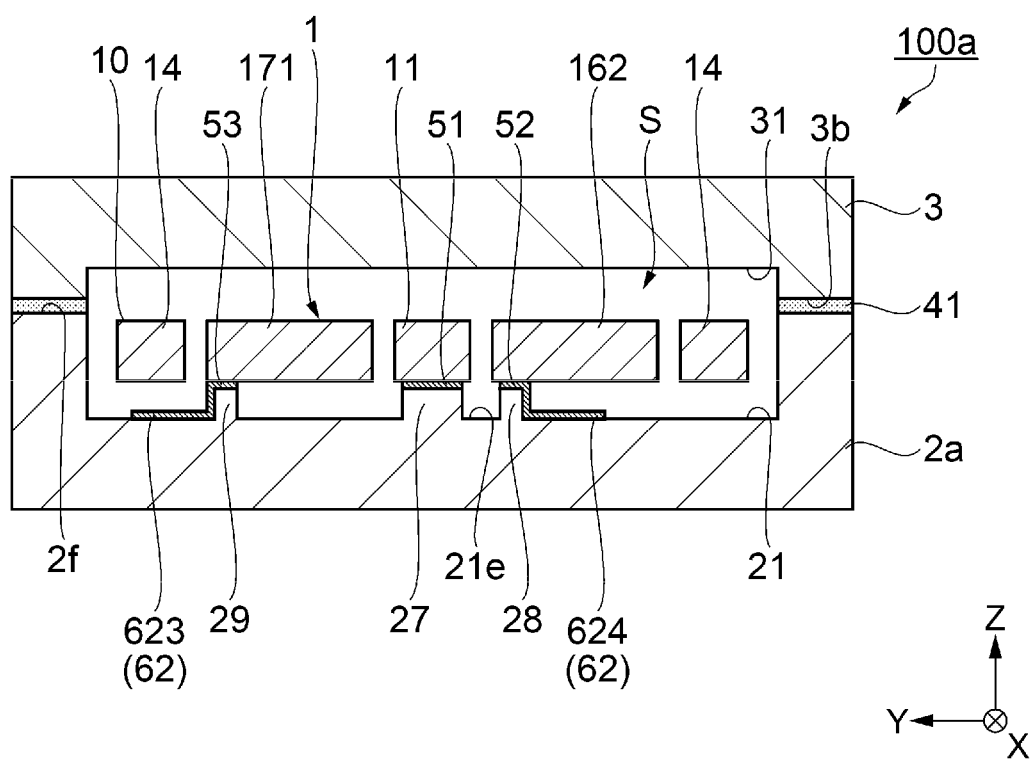
FIG. 5 is a cross-sectional view taken along C-C in FIG. 4.

As shown in FIGS. 4 and 5, in the acceleration sensor 100a according to this embodiment, the distance between the third anchor part 53 of the correction electrode 17 and the base part 11 is longer than the distance between the third anchor part 53 and the mass part 14. That is, the third anchor part 53 is located at an end on the side of the mass part 14 of the correction electrode 17. The anchor 29 provided in the recess 21 of the substrate 2a is arranged at a position facing the third anchor part 53. Therefore, the distance between the correction electrode 17, and the third terminal 633 and the fifth terminal 635 for output to an external device, is reduced. This can reduce the length of the third wiring 623 and the fifth wiring 625 electrically coupling the correction electrode 17 to the third terminal 633 and the fifth terminal 635.

In the acceleration sensor 100a, the distance between the third anchor part 53 of the correction electrode 17 and the base part 11 is longer than the distance between the third anchor part 53 and the mass part 14. Therefore, the length of the third wiring 623 and the fifth wiring 625 electrically coupling the correction electrode 17 to the third terminal 633 and the fifth terminal 635 for output to an external device can be reduced. This can reduce the electrical resistivity of the third wiring 623 and the fifth wiring 625 and achieve noise reduction and improvement in response of the acceleration sensor 100a.

Third Embodiment

Next, a physical quantity sensor according to a third embodiment of the disclosure will be described, using an acceleration sensor 100b as an example and referring to FIG. 6.

Figure 6:
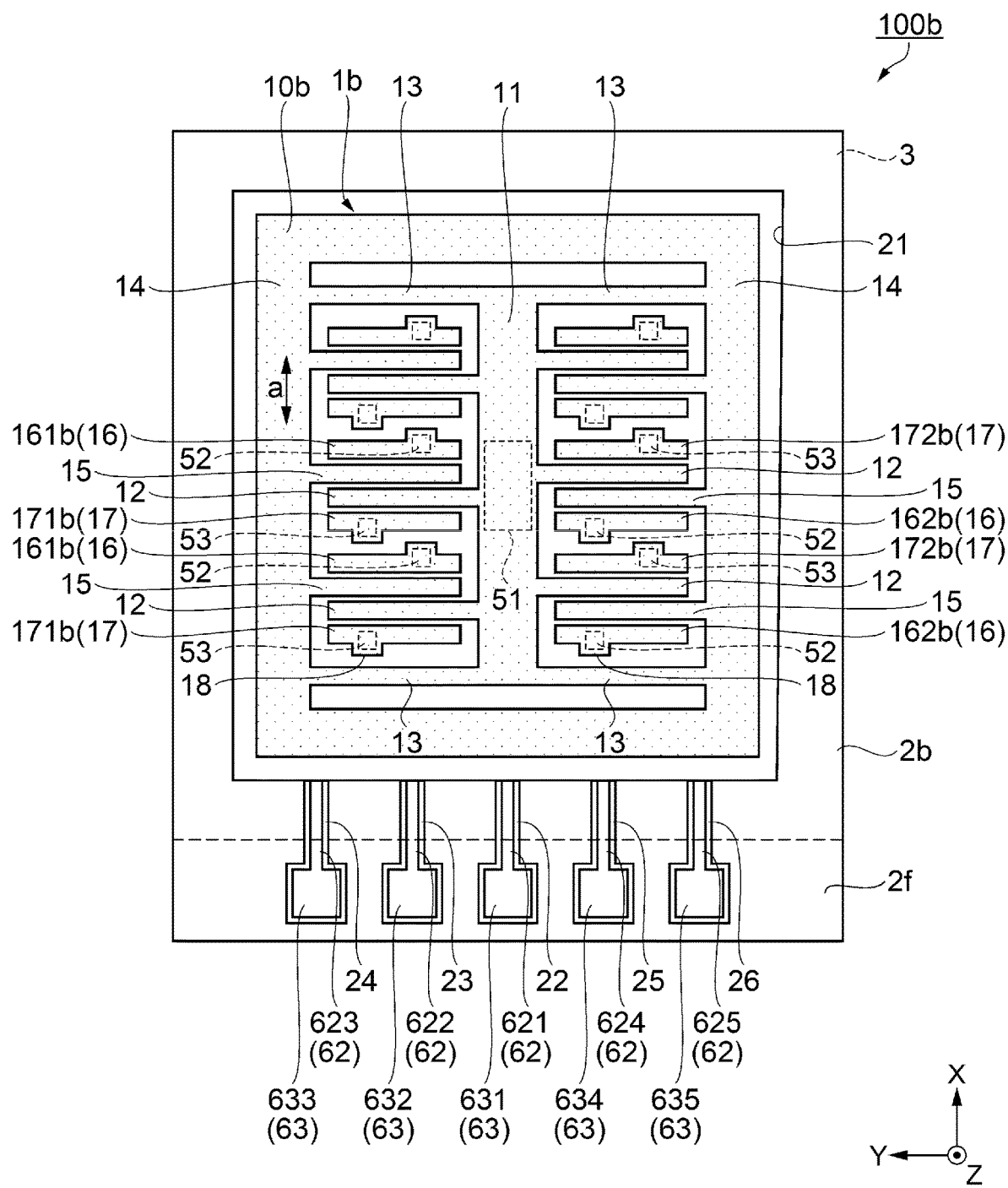
FIG. 6 is a plan view showing a schematic structure of a physical quantity sensor according to a third embodiment of the disclosure.

FIG. 6 is a plan view showing a schematic structure of the physical quantity sensor according to the third embodiment of the disclosure. FIG. 6 shows the state where the lid 3 is removed for the sake of convenience in describing the internal configuration of the acceleration sensor 100b. In FIG. 6, the wiring 62 in the recess 21 of a substrate 2b is omitted.

The acceleration sensor 100b according to this embodiment is similar to the acceleration sensor 100 according to the first embodiment except that mainly the configuration of a moving member 10b of a functional element 1b and the shape of the detection electrode 16 and the correction electrode 17 are different.

In the description below, the acceleration sensor 100b according to the third embodiment is described mainly in terms of the difference from the foregoing embodiment and the description of similar matters is omitted. In FIG. 6, components similar to those in the foregoing embodiment are denoted by the same reference signs.

As shown in FIG. 6, in the acceleration sensor 100b in this embodiment, the correction electrode 17 has a protrusion 18 protruding to the side opposite to the side facing the first finger electrode 12, and the detection electrode 16 has the protrusion 18 protruding to the side opposite to the side facing the second finger electrode 15. The second anchor part 52 is provided at the protrusion 18 of the detection electrode 16. The third anchor part 53 is provided at the protrusion 18 of the correction electrode 17. An anchor (not illustrated) is arranged at the positions facing the second anchor part 52 and the third anchor part 53 in the recess 21 of the substrate 2b. The protrusion 18 of each of a first detection electrode 161b and a second detection electrode 162b is provided on the side of the base part 11. The protrusion 18 of each of a first correction electrode 171b and a second correction electrode 172b is provided on the side of the mass part 14. Arranging the protrusion 18 of the detection electrode 16 and the protrusion 18 of the correction electrode 17 in such a way as to face each other in this manner can reduce the space between the correction electrode 17 and the detection electrode 16 and therefore enables a large number of correction electrodes 17 and detection electrodes 16 to be arranged. This can improve the detection sensitivity of the acceleration sensor 100b.

In the acceleration sensor 100b, the correction electrode 17 has the protrusion 18 protruding to the side opposite to the side facing the first finger electrode 12, and the detection electrode 16 has the protrusion 18 protruding to the side opposite to the side facing the second finger electrode 15. Therefore, even when the width (length along the X-axis) of the detection electrode 16 and the correction electrode 17 is reduced, the area of the second anchor part 52 to fix the detection electrode 16 and the area of the third anchor part 53 to fix the correction electrode 17 can be secured. Also, arranging the protrusion 18 of the detection electrode 16 and the protrusion 18 of the correction electrode 17 in such a way as to face each other can reduce the space between the correction electrode 17 and the detection electrode 16. This enables a large number of correction electrodes 17 and detection electrodes 16 to be arranged and can further improve the detection accuracy for an acceleration applied to the acceleration sensor 100b.

Electronic Apparatus

Next, an electronic apparatus using the foregoing acceleration sensor 100 will be described with reference to FIGS. 7, 8, and 9.

First, a mobile personal computer 1100 as an example of the electronic apparatus is described with reference to FIG. 7. FIG. 7 is a perspective view schematically showing the configuration of the mobile personal computer as an example of the electronic apparatus.

In this illustration, the personal computer 1100 is made up of a main body section 1104 having a keyboard 1102, and a display unit 1106 having a display section 1108. The display unit 1106 is supported in such a way as to be able to pivot via a hinge structure in relation to the main body section 1104. The foregoing acceleration sensor 100 is built in such a personal computer 1100. Based on detection data from the personal computer 1100, a control unit 1110 can perform control such as attitude control.

Next, a smartphone 1200 as an example of the electronic apparatus will be described with reference to FIG. 8. FIG. 8 is a perspective view schematically showing the configuration of the smartphone (mobile phone) as an example of the electronic apparatus.

In this illustration, the foregoing acceleration sensor 100 is incorporated in the smartphone 1200. Detection data (acceleration data) detected by the acceleration sensor 100 is transmitted to a control unit 1201 of the smartphone 1200. The control unit 1201 includes a CPU (central processing unit). The control unit 1201 can recognize the attitude and behavior of the smartphone 1200, based on the received detection data, and can change a display image displayed on a display unit 1208, output a warning sound or a sound effect, and drive a vibration motor to vibrate the main body. In other words, the control unit 1201 can carry out motion sensing of the smartphone 1200, and change the display content or generate a sound or vibration, based on the measured attitude and behavior. Particularly, when executing a game application, the user can enjoy a sense of reality.

Next, a digital still camera 1300 as an example of the electronic apparatus will be described with reference to FIG. 9. FIG. 9 is a perspective view showing the configuration of the digital still camera as an example of the electronic apparatus. This illustration also shows the coupling to an external device in a simplified manner.

In this illustration, a display unit 1310 is provided at the back side of a case (body) 1302 of the digital still camera 1300, to display an image based on a picked-up image signal from a CCD. The display unit 1310 also functions as a viewfinder showing a subject as an electronic image. At the front side (back side in the illustration) of the case 1302, a light receiving unit 1304 including an optical lens (image pickup optical system) and a CCD or the like is provided.

The camera operator confirms a subject image displayed on the display unit 1310 and presses a shutter button 1306. In response to this, a picked-up image signal from the CCD at that point is transferred to and stored in a memory 1308. At a lateral side of the case 1302 of the digital still camera 1300, a video signal output terminal 1312 and a data communication input/output terminal 1314 are provided. As illustrated, a television monitor 1430 is coupled to the video signal output terminal 1312, and a personal computer 1440 is coupled to the data communication input/output terminal 1314, according to need. Also, in response to a predetermined operation, the picked-up image signal stored in the memory 1308 is outputted to the television monitor 1430 and the personal computer 1440. The foregoing acceleration sensor 100 is built in such a digital still camera 1300. Based on detection data from the acceleration sensor 100, a control unit 1316 can perform control such as camera shake correction.

Such an electronic apparatus has the acceleration sensor 100 as the physical quantity sensor, and the control unit 1110, 1201, 1316, and is therefore compact and very reliable.

Figure 7:
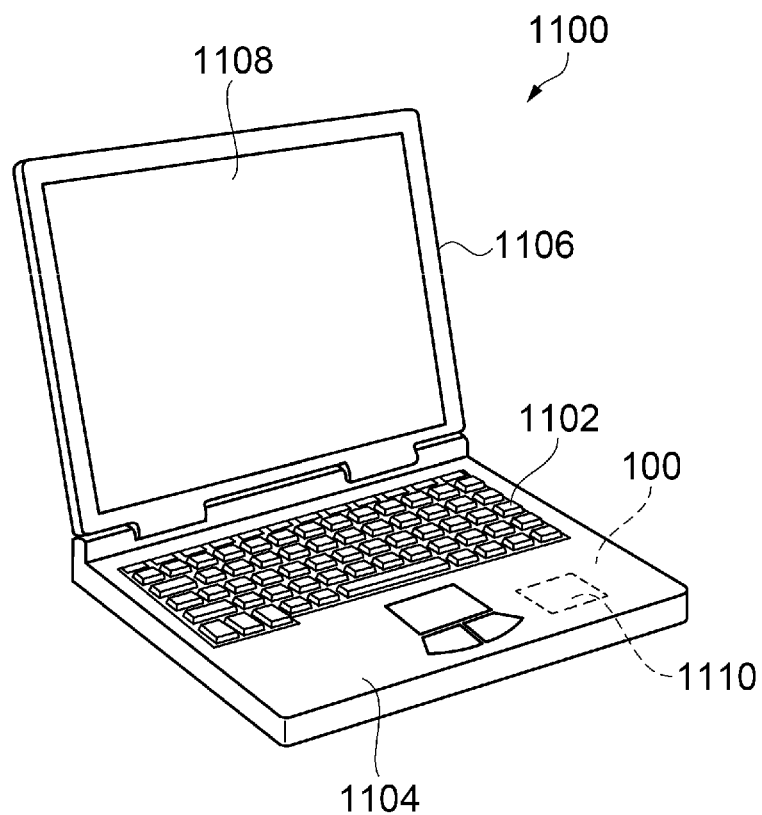
FIG. 7 is a perspective view schematically showing the configuration of a mobile personal computer as an example of an electronic apparatus.
Figure 8:
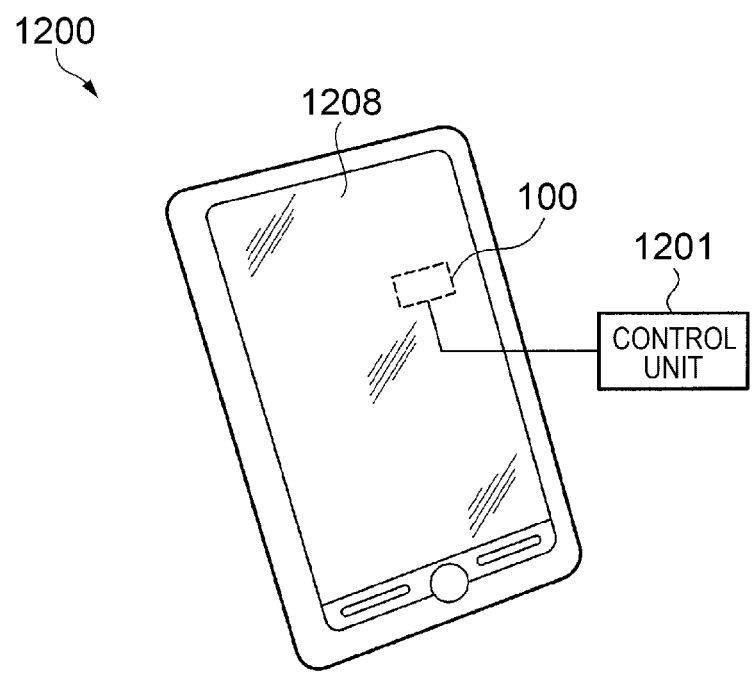
FIG. 8 is a perspective view schematically showing the configuration of a smartphone (mobile phone) as an example of an electronic apparatus.
Figure 9:
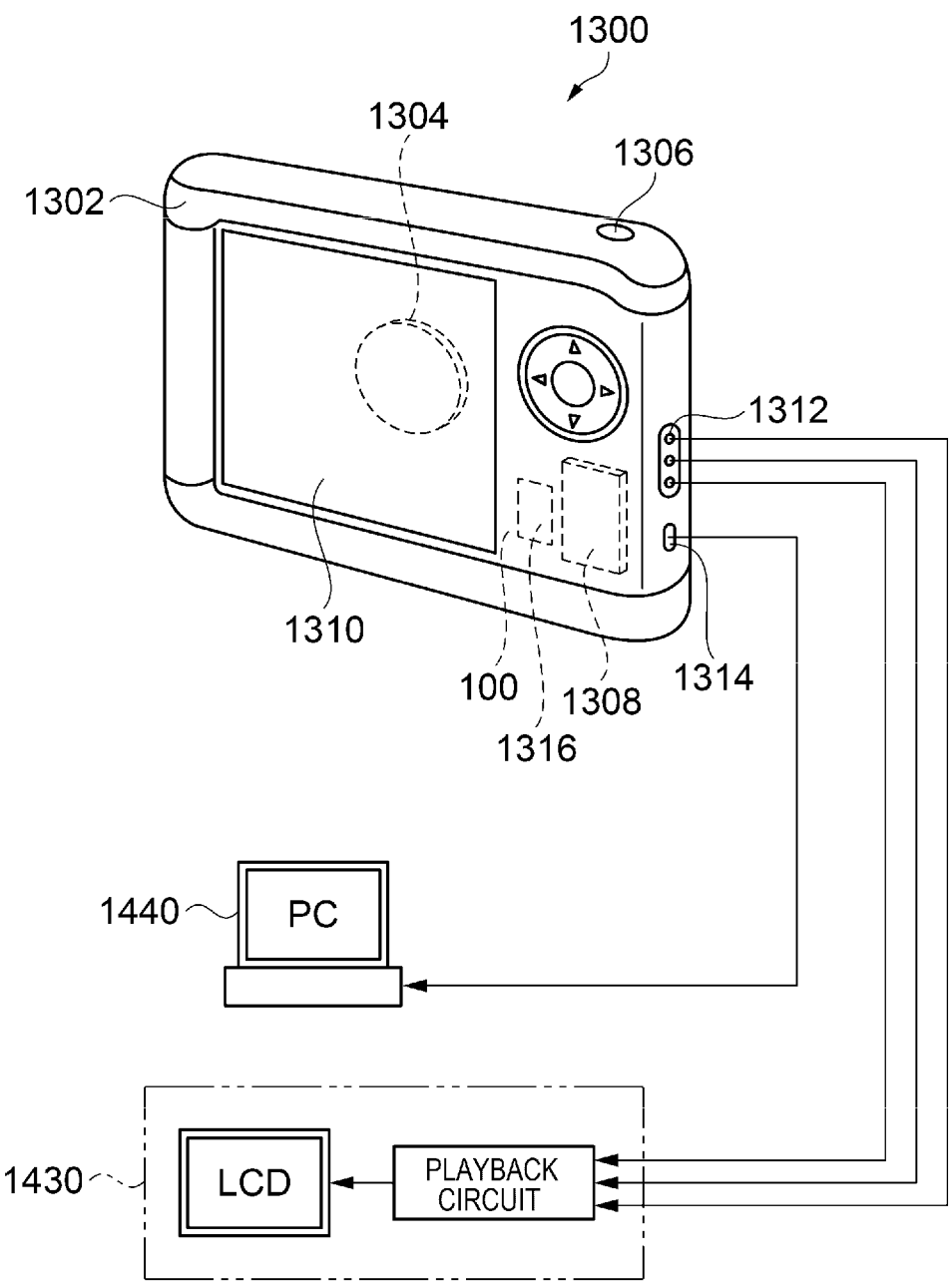
FIG. 9 is a perspective view showing the configuration of a digital still camera as an example of an electronic apparatus.

The electronic apparatus having the acceleration sensor 100 as the physical quantity sensor can be applied not only to the personal computer 1100 of FIG. 7, the smartphone 1200 of FIG. 8, and the digital still camera 1300 of FIG. 9, but also to a tablet terminal, timepiece, inkjet ejection device (for example, inkjet printer), laptop personal computer, television, video camera, video tape recorder, car navigation device, pager, electronic organizer (including one with a communication function), electronic dictionary, electronic calculator, electronic game device, word processor, workstation, videophone, security monitor, electronic binoculars, POS terminal, medical equipment (for example, electronic body thermometer, blood pressure monitor, blood sugar monitor, electrocardiograph, ultrasonic diagnostic device, electronic endoscope), fishfinder, various measuring devices, instruments (for example, instruments of vehicle, aircraft, ship), flight simulator, seismometer, pedometer, clinometer, vibration gauge measuring vibrations of a hard disk, attitude control device for a robot or a flying object such as a drone, control device used for inertial navigation for autonomous driving of an automobile, and the like.

Vehicle

Next, a vehicle using the foregoing acceleration sensor 100 will be described with reference to FIG. 10.

Figure 10:
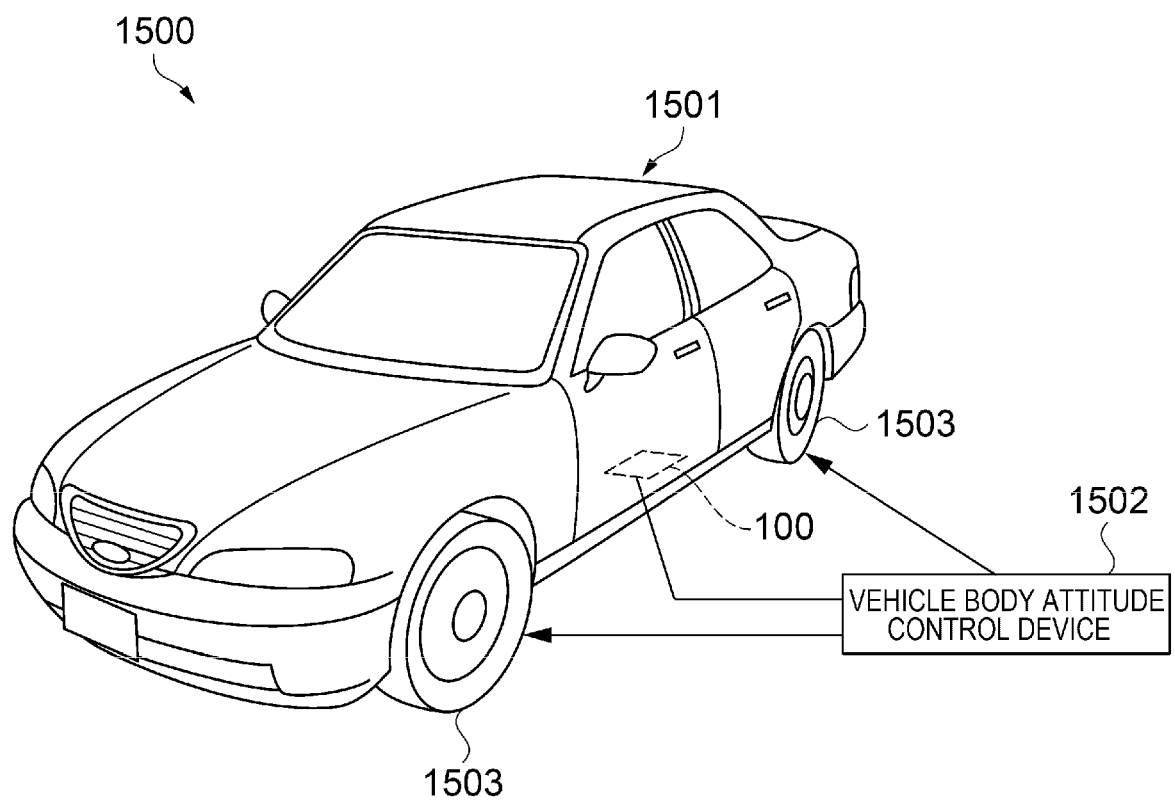
FIG. 10 is a perspective view showing the configuration of an automobile as an example of a vehicle.

FIG. 10 is a perspective view showing the configuration of an automobile as an example of the vehicle.

As shown in FIG. 10, the acceleration sensor 100 as an example of the physical quantity sensor is built in an automobile 1500. For example, the acceleration sensor 100 can detect the movement (position) and attitude of a vehicle body 1501. A detection signal from the acceleration sensor 100 is supplied to a vehicle body attitude control device 1502 controlling the movement and attitude of the vehicle body. Based on the signal, the vehicle body attitude control device 1502 can detect the attitude of the vehicle body 1501 and can control stiffness/softness of suspension or control braking on individual wheels 1503 according to the result of the detection.

The acceleration sensor 100 can also be broadly applied to a keyless entry system, immobilizer, car navigation system, car air-conditioning, anti-lock braking system (ABS), airbag, tire pressure monitoring system (TPMS), engine control system (engine system), control device for autonomous driving inertial navigation, and electronic control unit (ECU) such as battery monitor for hybrid car or electric vehicle.

The acceleration sensor 100 as the physical quantity sensor applied to the vehicle can also be applied to, for example, movement and attitude control of a biped robot, train or the like, movement and attitude control of remote-controlled or autonomous flying object such as radio-controlled airplane, radio-controlled helicopter, or drone, movement and attitude control of agricultural machinery (farm machine) or construction machinery (building machine), and control of rocket, artificial satellite, ship, and AGV (automated guided vehicle) or the like, in addition to the foregoing examples. As described above, to implement the movement (position) and attitude control of various vehicles, the acceleration sensor 100 and a control unit (not illustrated) and an attitude control unit for the corresponding vehicle are incorporated in the vehicle.

Such a vehicle has the acceleration sensor 100 as the physical quantity sensor and the control unit (for example, vehicle body attitude control device 1502 as the attitude control unit) and is therefore compact and very reliable.

The content derived from the foregoing embodiments is described below as each aspect.

Aspect 1

According to this aspect, a physical quantity sensor includes: a substrate; a correction electrode fixed to the substrate; a detection electrode fixed to the substrate; and a moving member fixed to the substrate. The moving member has: a base part; a first anchor part fixed to the substrate; a first finger electrode extending from the base part and facing the correction electrode; a mass part coupled to the base part via an elastic part, arranged at an opposite side of the correction electrode from the base part, and provided in such a way as to be displaceable in a direction of detection of a physical quantity in relation to the substrate; and a second finger electrode extending from the mass part and facing the detection electrode. A distance between a second anchor part where the detection electrode and the substrate are fixed, and the base part, is shorter than a distance between the second anchor part and the mass part.

According to this aspect, the distance between the second anchor part, where the detection electrode and the substrate are fixed, and the base part, is shorter than the distance between the second anchor part and the mass part. Therefore, the distance between the second anchor part and the first anchor part, where the moving member is fixed on the substrate, can be reduced. Thus, even when the substrate warps, for example, due to temperature change, the amount of displacement of the substrate due to the warping is smaller than when the distance between the second anchor part and the first anchor part is longer. This can reduce the influence on the detection electrode of the stress applied to the substrate and therefore can reduce the correction error and improve the detection accuracy for a physical quantity applied to the physical quantity sensor.

Aspect 2

In the physical quantity sensor described in the foregoing aspect, a distance between a third anchor part where the correction electrode and the substrate are fixed, and the base part, may be shorter than a distance between the third anchor part and the mass part.

According to this aspect, the distance between the third anchor part, where the correction electrode and the substrate are fixed, and the base part, is shorter than the distance between the third anchor part and the mass part. Therefore, the stress applied between the third anchor part of the correction electrode and the first anchor part of the moving member due to the warping of the substrate can be reduced. This can reduce the influence on the correction electrode of the stress applied to the substrate, further reduce the correction error, and therefore improve the detection accuracy for a physical quantity applied to the physical quantity sensor.

Aspect 3

In the physical quantity sensor described in the foregoing aspect, a distance between a third anchor part where the correction electrode and the substrate are fixed, and the base part, may be longer than a distance between the third anchor part and the mass part.

According to this aspect, the distance between the third anchor part of the correction electrode and the base part is longer than the distance between the third anchor part and the mass part. Therefore, the length of the wiring electrically coupling the correction electrode to the terminal for output to an external device can be reduced. This can reduce the electrical resistivity of the wiring and achieve noise reduction and improvement in response.

Aspect 4

In the physical quantity sensor described in the foregoing aspect, the mass part may be spaced apart from the substrate.

According to this aspect, since the mass part is spaced apart from the substrate, the mass part can easily move due to a physical quantity applied to the physical quantity sensor. Therefore, a physical quantity applied to the physical quantity sensor can be easily detected.

Aspect 5

In the physical quantity sensor described in the foregoing aspect, the correction electrode and the detection electrode may respectively have a rectangular shape.

According to this aspect, since the correction electrode and the detection electrode are respectively rectangular, a large facing area with the finger electrodes facing the correction electrode and the detection electrode can be secured, and a large electrostatic capacitance value between the correction electrode and the detection electrode, and the finger electrodes, can be secured. This can further improve the detection accuracy for a physical quantity applied to the physical quantity sensor.

Aspect 6

In the physical quantity sensor described in the foregoing aspect, the correction electrode may have a protrusion protruding to a side opposite to a side facing the first finger electrode. The detection electrode may have a protrusion protruding to a side opposite to a side facing the second finger electrode.

According to this aspect, the correction electrode has the protrusion protruding to the side opposite to the side facing the first finger electrode, and the detection electrode has the protrusion protruding to the side opposite to the side facing the second finger electrode. Therefore, even when the width of the detection electrode and the correction electrode is reduced, the area of the second anchor part to fix the detection electrode and the area of the third anchor part to fix the correction electrode can be secured. Also, arranging the protrusion of the correction electrode and the protrusion of the detection electrode in such a way as to face each other can reduce the space between the correction electrode and the detection electrode. This enables a large number of correction electrodes and detection electrodes to be arranged and can further improve the detection accuracy for a physical quantity applied to the physical quantity sensor.

Aspect 7

In the physical quantity sensor described in the foregoing aspect, the correction electrode may have a first correction electrode and a second correction electrode. The detection electrode may have a first detection electrode and a second detection electrode. The first correction electrode and the second detection electrode may be arranged in line symmetry about an axis in the direction of detection.

According to this aspect, since the first correction electrode and the second detection electrode are arranged in line symmetry about the axis in the direction of detection, the distance between the third anchor part of the first correction electrode and the second anchor part of the second detection electrode, and the first anchor part, can be equalized and the stress due to the warping of the substrate can be equalized between these. Thus, the distance between the third anchor part of the correction electrode and the second anchor part of the detection electrode, and the first anchor part, is equalized, and the stress applied to the correction electrode and the stress applied to the detection electrode are equalized. Therefore, the influence of the stress applied to the detection electrode can be corrected.

Aspect 8

In the physical quantity sensor described in the foregoing aspect, the first correction electrode and the second correction electrode may be arranged in point symmetry about a center of gravity of the moving member.

According to this aspect, since the first correction electrode and the second correction electrode are arranged in point symmetry about the center of gravity of the moving member, the distance between the third anchor part of the first correction electrode and the first anchor part and the distance between the second anchor part of the first detection electrode and the first anchor part can be equalized. Also, the distance between the third anchor part of the second correction electrode and the first anchor part and the distance between the second anchor part of the second detection electrode and the first anchor part can be equalized. Thus, the distance between the third anchor part of the correction electrode and the second anchor part of the detection electrode, and the first anchor part, is equalized, and the stress applied to the correction electrode and the stress applied to the detection electrode are equalized. Therefore, the influence of the stress applied to the detection electrode can be corrected.

Aspect 9

According to this aspect, an electronic apparatus includes: the foregoing physical quantity sensor; and a control unit performing control based on a detection signal outputted from the physical quantity sensor.

According to this aspect, an electronic apparatus that can achieve the effect of the physical quantity sensor according to the disclosure and that is very reliable can be provided.

Aspect 10

According to this aspect, a vehicle includes: the foregoing physical quantity sensor; and a control unit performing control based on a detection signal outputted from the physical quantity sensor.

According to this aspect, a vehicle that can achieve the effect of the physical quantity sensor according to the disclosure and that is very reliable can be provided.

What is claimed is:

1. A physical quantity sensor comprising:
   a substrate;
   a correction electrode fixed to the substrate;
   a detection electrode fixed to the substrate; and
   a moving member fixed to the substrate, wherein
   the moving member comprises:
   a base part;
   a first anchor part fixed to the substrate;
   a mass part spaced from and facing the base part, the mass part coupled to the base part via an elastic part extending between the mass part and the base part, the mass part being arranged at an opposite side of the correction electrode than the base part such that the correction electrode is disposed between the mass part and the base part, and the mass part being provided in such a way as to be displaceable in a direction of detection of a physical quantity in relation to the substrate;
   a first finger electrode extending from the base part toward the mass part and facing the correction electrode; and
   a second finger electrode extending from the mass part toward the base part and facing the detection electrode, and
   a distance between a second anchor part where the detection electrode and the substrate are fixed, and the base part, is shorter than a distance between the second anchor part and the mass part.

2. The physical quantity sensor according to claim 1, wherein
   a distance between a third anchor part where the correction electrode and the substrate are fixed, and the base part, is shorter than a distance between the third anchor part and the mass part.

3. The physical quantity sensor according to claim 1, wherein
   a distance between a third anchor part where the correction electrode and the substrate are fixed, and the base part, is longer than a distance between the third anchor part and the mass part.

4. The physical quantity sensor according to claim 1, wherein
   the mass part is spaced apart from the substrate.

5. The physical quantity sensor according to claim 1, wherein
   the correction electrode and the detection electrode respectively have a rectangular shape.

6. The physical quantity sensor according to claim 5, wherein
   the correction electrode has a protrusion protruding to a side opposite to a side facing the first finger electrode, and the detection electrode has a protrusion protruding to a side opposite to a side facing the second finger electrode.

7. The physical quantity sensor according to claim 1, wherein
   the correction electrode has a first correction electrode and a second correction electrode,
   the detection electrode has a first detection electrode and a second detection electrode, and
   the first correction electrode and the second detection electrode are arranged in line symmetry about an axis in the direction of detection.

8. The physical quantity sensor according to claim 7, wherein
   the first correction electrode and the second correction electrode are arranged in point symmetry about a center of gravity of the moving member.

9. An electronic apparatus comprising:
   the physical quantity sensor according to claim 1; and
   a control unit performing control based on a detection signal outputted from the physical quantity sensor.

10. A vehicle comprising:
the physical quantity sensor according to claim 1; and
a control unit performing control based on a detection signal outputted from the physical quantity sensor.

11. The physical quantity sensor according to claim 1, wherein the first finger extends from the base part toward the mass part in a same direction as the elastic part extends between the mass part and the base part, and the second finger extends from the mass part toward the base part in the same direction as the elastic part extends between the mass part and the base part.

12. The physical quantity sensor according to claim 11, wherein the first finger is separated and spaced from the mass part in the same direction as the elastic part extends between the mass part and the base part, and the second finger is separated and spaced from the base part in the same direction as the elastic part extends between the mass part and the base part.

13. The physical quantity sensor according to claim 1, wherein the first finger is separated and spaced from the mass part in a same direction as the elastic part extends between the mass part and the base part, and the second finger is separated and spaced from the base part in the same direction as the elastic part extends between the mass part and the base part.

\* \* \* \* \*